July 29, 1941. A. E. JURS 2,250,767
FLUID FLOW CONTROL APPARATUS
Filed March 3, 1939 3 Sheets-Sheet 1
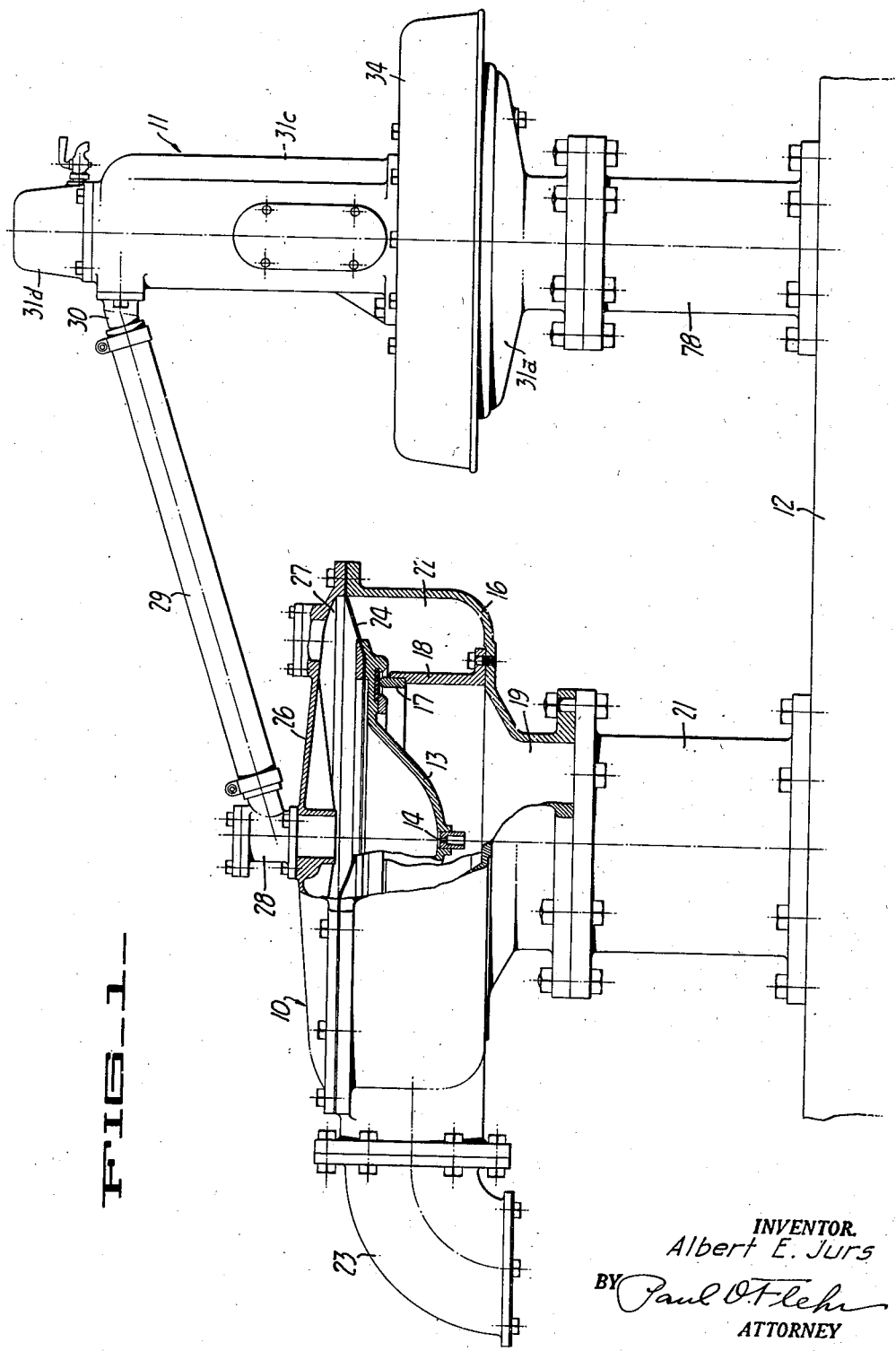
INVENTOR.
Albert E. Jurs
BY Paul O. Flehr
ATTORNEY

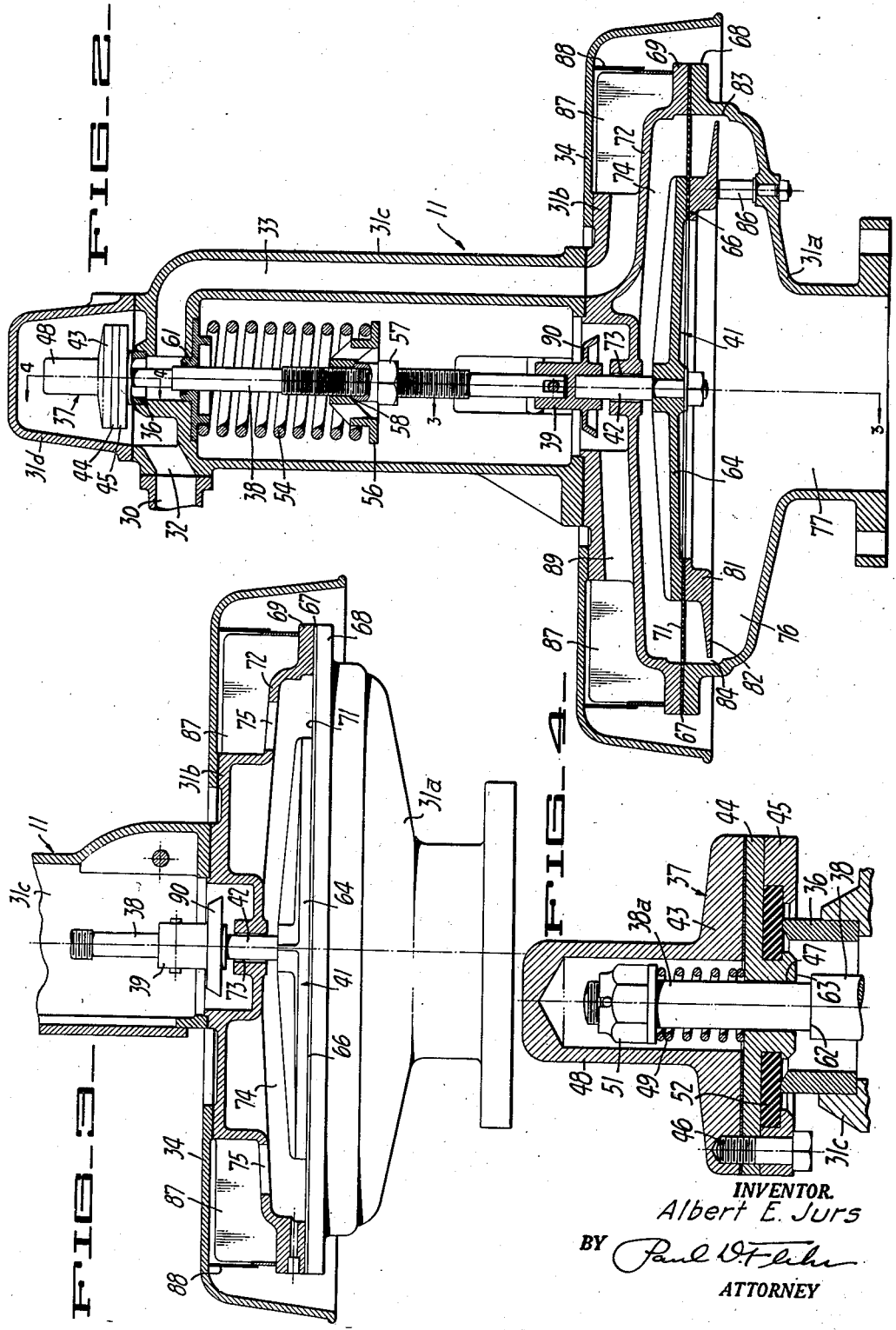

July 29, 1941.  A. E. JURS  2,250,767
FLUID FLOW CONTROL APPARATUS
Filed March 3, 1939  3 Sheets-Sheet 3
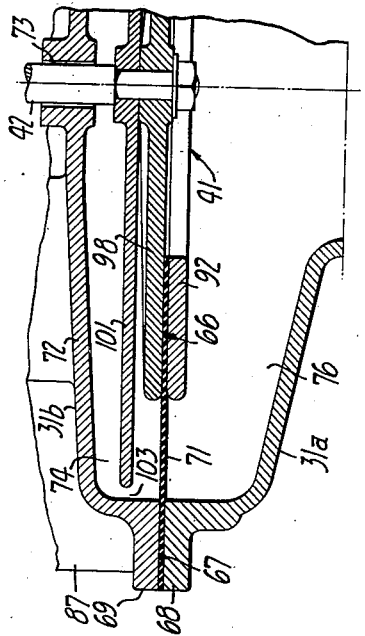
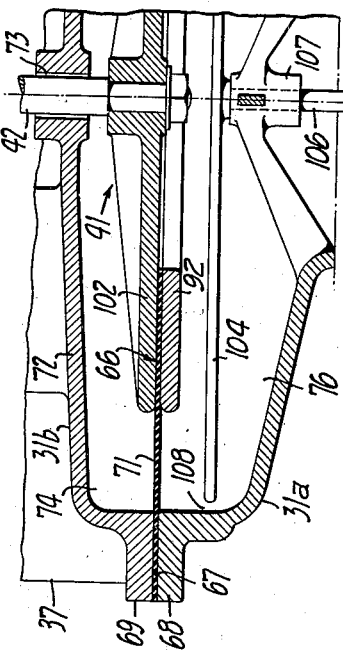
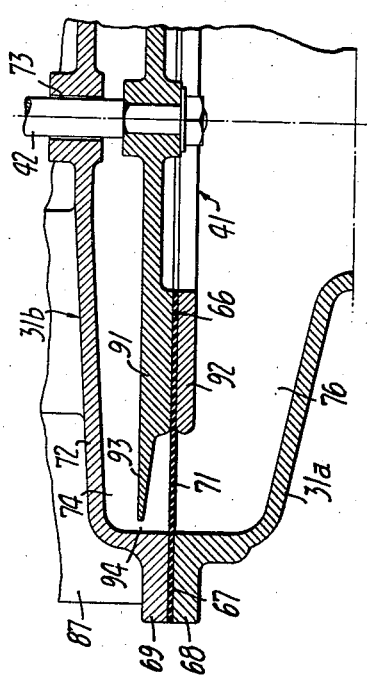
INVENTOR
Albert E. Jurs
BY Paul O. Flehr
ATTORNEY Patented July 29, 1941

2,250,767

UNITED STATES PATENT OFFICE 2,250,767

FLUID FLOW CONTROL APPARATUS

Albert E. Jurs, Piedmont, Calif.

Application March 3, 1939, Serial No. 259,630

7 Claims. (Cl. 137—53)

This invention relates generally to apparatus for controlling or venting gases or fluids in accordance with fluid pressures. More particularly the invention is concerned with apparatus for automatically relieving gas or vapor pressures, such as may accumulate or exist in gas or vapor systems. Apparatuses of this type are used in connection with pressure receivers or storage tanks, as for example where storage tanks contain volatile liquids like gasoline or other petroleum fractions, and where abnormal vapor pressure within the tank must be relieved by venting or withdrawal of gas.

It is a general object of the invention to provide improved regulating apparatus suitable for use in conjunction with storage tanks containing volatile liquids, and which will give full assurance for the safety of the tank against either abnormal climatic conditions, or failure of vital parts of the apparatus.

Another object of the invention is to provide an improved form of pilot or control valve mechanism, which will function irrespective of rupture of the operating diaphragm.

Additional objects of the invention will appear from the following description in which the preferred embodiment of the invention has been set forth in detail in conjunction with the accompanying drawings.

Referring to the drawings:

Fig. 1 is a side elevational view, partly in cross-section, illustrating apparatus incorporating the present invention and applied to a storage tank.

Fig. 2 is a side elevational view in cross-section, illustrating the pilot valve mechanism of the apparatus shown in Fig. 1.

Fig. 3 is a cross-sectional detail taken along the line 3—3 of Fig. 2.

Fig. 4 is an enlarged cross-sectional detail taken along the line 4—4 of Fig. 2.

Figs. 5 to 7 inclusive are cross-sectional details on an enlarged scale, showing various ways in which the pilot diaphragm assembly may be associated with means for forming a supplemental pressure area.

The apparatus as illustrated in Fig. 1 consists generally of a main valve mechanism 10, and a pilot valve mechanism 11. The mechanism 10 is similar to that disclosed and claimed in copending application Serial No. 215,607, filed June 24, 1938, in the name of Albert E. Jurs. To illustrate a typical installation, both the mechanisms 10 and 11 are shown mounted upon the top wall 12 of a storage tank.

To briefly review the construction of the main valve mechanism 10, it consists of a main valve closure pallet 13, formed of suitable metal or metal alloy. The central portion of this closure is dished downwardly and its lower end is provided with a restricted orifice 14. The pallet is positioned within the hollow body 16, and when in closed position it engages the seat ring 17. This ring in turn is carried by the annular raised flange 18. The inlet opening 19 of the body is connected by conduit 21 to the upper tank wall 12. The space 22 surrounding annular flange 18, connects through conduit 23 with the atmosphere or to some low pressure system.

In conjunction with the pallet or closure 13 there is an annular flexible diaphragm element 24. This diaphragm element is formed of suitable flexible material such as fabric reinforced synthetic rubber. Its inner peripheral edge portion is clamped and sealed to the outer peripheral portion of the closure 13, as illustrated. The outer peripheral edge portion of the diaphragm 24 is clamped between the main body part 16, and the upper body cover 26. When the pallet 13 is in closed position as illustrated in Fig. 1 there is no appreciable sag to the diaphragm 24, and the diaphragm serves to generally center the pallet with respect to the valve seat.

The space 27 above the closure 13 and diaphragm 24, forms a gas chamber which is at all times in communication with the inlet 19 through the restricted orifice 14. Therefore under normal conditions with the pallet 13 closed, the pressure in chamber 27 is the same as that in the inlet 19. However, upon rapidly venting gas from chamber 27, the pressure in the same falls sufficiently or considreably below the pressure in the inlet 19, and therefore fluid pressure acts upwardly upon the pallet 13 to move the same to open position.

The improved pilot valve mechanism 11 is for the purpose of venting chamber 27 automatically, in accordance with the pressure within the storage tank. As shown in Fig. 1 the cover 26 is provided with a fitting 28 which communicates with chamber 27 and which in turn is connected to the pipe or extension hose 29. The other end of this hose connects to the fitting 30 of the pilot valve mechanism 11.

Referring to Figs. 2, 3 and 4, the pilot valve mechanism consists of a body structure which for convenience is made of separate sections or parts 31a, 31b, 31c and 31d. These parts are assembled and clamped together in a suitable fashion, and serve to house the various working parts. The body part 31c is provided with the inlet and discharge passages 32 and 33. Inlet passage 32 connects with the corresponding end of hose 29, while discharge passage 33 connects to the atmosphere through body part 31b and the lower protecting housing 34.

The body part 31c also carries the valve seat 36, with which the pilot valve assembly 37 cooperates. The valve assembly 37 is in turn attached to the upper end of an operating rod 38, which extends downwardly through the body part 31c, and which has its lower end connected to the coupling sleeve 39.

The diaphragm assembly 41 is held within the body parts 31a and 31b, and the center of this assembly is connected to the coupling sleeve 39 by the rod 42.

A suitable detailed construction for the pilot valve assembly 37, is illustrated in Fig. 4. In this instance it makes use of circularly contoured parts 43, 44 and 45, which are clamped together as by means of screws 46. The upper end 38a of rod 38 is of reduced diameter and extends loosely through a central opening 47 in the part 44. The part 43 has a hollow extension 48, to house the upper rod portion 38a, and to also house a compression spring 49. The lower end of this spring is seated upon the part 44, and its upper end bears upon the nut 51, whereby the force of spring 49 serves to urge the valve 37 downwardly relative to the rod 38. The pressure exerted by spring 49 determines the maximum force with which the pilot valve is pressed upon the seat ring 36.

The valve part 45 is in the nature of a clamping ring, with its inner periphery recessed to engage and retain the valve facing 52. This facing can be formed of suitable material such as synthetic rubber, in which case the ring 36 can be formed of a molded phenolic condensate product like "Bakelite."

To form a loading force tending to urge the valve member towards closed position, a compression spring 54 is provided which acts downwardly upon the rod 38. The upper end of this spring is seated upon the body, while its lower end is seated upon the thrust ring 56, which in turn is carried by the upper end of a nut 57. The contacting surfaces 58 between thrust ring 56, and the upper end of nut 57, can be formed spherical as illustrated, in order to enable limited freedom of movement of the thrust ring 56, without applying clamping forces to the rod 38. Nut 57 is threaded upon the rod 38, and can be adjusted in order to vary the compression of spring 54. A guide bushing 61 for rod 38 serves to maintain this rod and also the valve 37 in proper alignment.

It may be explained at this point that when the rod 38 is moved upwardly by upward movement of the diaphragm assembly 41, the shoulder 62 on rod 38 engages the lower opposed face 63 on the valve 37, and thereafter the valve is lifted from its seat.

The diaphragm assembly 41 is preferably formed of a circularly contoured diaphragm plate 64, in conjunction with a flexible diaphragm element 66. The diaphragm plate 64 is relatively rigid, and can be formed of suitable metal, while the diaphragm element 66 is of suitable flexible material such as fabric reinforced synthetic rubber. The outer peripheral edge portion 67 of the flexible diaphragm element 66, is clamped between the flanges 68 and 69, formed on the body parts 31a and 31b. Since these flanges are annular or circular in contour, the portion 71 of the flexible diaphragm element, extending between the outer periphery of the diaphragm plate 64 and the inner periphery of the flanges 68 and 69, forms an annular diaphragm portion which is free to flex to permit movements of the assembly between upper and lower limits, corresponding to open and closed positions of valve 37.

The central portion of the diaphragm plate 64 is rigidly attached to the rod 42. The body part 31b has a wall portion 72 extending generally over the diaphragm assembly, and this wall portion has an opening 73 to accommodate the rod 42. The space 74 above the diaphragm assembly 41, is freely vented to the atmosphere through openings 75 (Fig. 3) and through the interior of the protective covering 34. The space 76 below the diaphragm assembly connects with the inlet opening 77, which in turn connects to a source of gas under pressure. In the installation of Fig. 1 opening 77 connects with the storage tank, through the conduit 78.

Normally the pilot diaphragm assembly 41 presents a given area to gas pressure in chamber 76. Should the gas pressure in chamber 76 exceed a predetermined value, dependent upon the loading of the diaphragm, the diaphragm is moved upwardly to open the valve 37, and to retain the valve in open position until the pressure in chamber 76 decreases. With a conventional type of diaphragm, a rupture in the flexible element would permit a venting of gas from chamber 76 to the atmosphere, and if the rupture should be of sufficient size it would minimize if not entirely destroy effectiveness of the diaphragm in properly operating the valve 37.

In order to make certain that the diaphragm will operate the valve 37 irrespective of rupture of the flexible element 66, I make use of means serving in effect to form a supplemental pressure area for the diaphragm assembly, in the event of a rupture accompanied by venting of gas through the rupture. Thus attached to the underside of the diaphragm assembly there is an annular ring 81, which can be conveniently clamped against the lower side of the flexible diaphragm element 66, and attached by screws or like means to the peripheral portion of the diaphragm plate 64. This ring carries a laterally extending skirt or flange 82, having a circular outer periphery. In this instance the skirt is shown located somewhat below the flexible portion 71 of the diaphragm assembly, with its outer periphery spaced a short distance from the cylindrical wall surface 83 of the body part 31a. Thus in effect a restricted annular orifice 84 is formed between the outer periphery of the skirt or flange 82, and the adjacent surface of the body. The dimensioning of the diaphragm 71 may vary in different instances, in accordance with the specifications and requirements of service. Also there should be suitable relative proportioning between the area of the annular orifice 84, the area of the inlet 77 and the combined areas of the outlet openings 75. In the particular instance illustrated, the inlet 77 is about six inches in diameter, while the outer diameter of the skirt 82 is seventeen inches, the gap 84, $\tfrac{1}{16}$ of an inch, and the combined areas of the outlet openings 75 is somewhat larger than the area of the annular orifice 84. Also the flexible diaphragm portion 71 has an outer diameter of about 17½ inches, an inner diameter of about 13½ inches, and a mean average diameter of about 15½ inches. The manner in which the skirt or flange 82 functions, in conjunction with the orifice 84, to form a supplemental pressure area in the event of rupture of diaphragm portion 71 will be presently explained in detail.

Suitable stop means is provided for limiting downward movement of the pilot diaphragm assembly. Thus a plurality of studs 86 are mounted on the body part 31a, and are adapted to be engaged by the lower face of ring 81. When the diaphragm assembly 41 is in its lowermost position, these studs 86 oppose the entire pressure of spring 54. Also for the lowermost position of the diaphragm assembly 41, the spring 49 is under a predetermined amount of compression, thereby causing the pilot valve assembly 37 to be urged upon its seat ring 36, with a predetermined amount of force. The distance which rod 38 moves upwardly as the diaphragm assembly 41 moves from its lowermost to its uppermost limiting position, is such that after the initial part of such movement the opposed surfaces 62 and 63 come into engagement, after which the pilot valve assembly 37 moves upwardly to open position, together with the final upward movement of rod 38.

A plurality of webs or vanes 87 are shown disposed upon the exterior of body part 31b. These vanes serve the purpose of guiding condensate draining from passages 89, thus preventing such condensate from entering the openings 75 into the chamber 74. These vanes are shown generally enclosed by the housing or cover 34, and surrounding the vanes, there is a screen 88 for preventing entrance of foreign material.

It will be noted that certain parts are arranged to facilitate drainage of condensate. Thus the hose 29 illustrated in Fig. 1 is inclined to the horizontal, in order to drain condensate into the chamber 27, and thence through the orifice 14. The interior of body part 31c can drain through the inclined openings 89, and entrance of condensate into the opening 73 is minimized by the provision of a protective skirt 90, upon the coupling sleeve 39.

Operation of the apparatus described above, can be outlined as follows: It will be assumed that an installation is made as described in connection with Fig. 1, with both the main and pilot valve mechanisms connected to a tank through the top tank wall 12. Also it will be presumed that the spring 54 is set so that for a predetermined pressure of gas or vapor within the tank, the pilot or closure 13 will automatically open to vent gas from the tank through conduit 23. As long as the pressure of gas within the tank is below the value for which the apparatus is set to vent, the pilot diaphragm assembly 41 remains in its lowermost position, with the pilot valve 37 closed. Thus the pressure above or below the pallet 13 will be equalized through orifice 14, and because of the pressure area presented by the pallet together with diaphragm 24, the pallet is held closed upon the seat 17. If the gas pressure in the tank increases beyond the value for which the apparatus is set, the pilot diaphragm assembly 41 is urged upwardly to open valve 37, thus permitting venting of gas from chamber 27 through the connecting hose 29. Such venting of gas is immediately accompanied by a lowering of pressure in the chamber 27 above pallet 13, with the result that pressure acting upon the lower side of the pallet 13 forces the same to open position. In this connection it should be noted that the diameter of the seat ring 17 is preferably substantially greater than the diameter of the inlet opening 19, as described in said co-pending application Serial No. 215,607, in order to afford adequate forces to break any ice which may have accumulated upon the seating surfaces. The pallet 13 remains open until the pressure in the tank again falls below a given value, after which atmospheric pressure acting upon the upper side of the diaphragm assembly 41 together with the tension of spring 54 causes this diaphragm to move downwardly to close the valve 37. Immediately after closing of this pilot valve the pressure again builds up in chamber 27 above the pallet, by virtue of flow of gas through the orifice 14. Building up of pressure in chamber 27 is accompanied by closing movement of pallet 13.

As previously pointed out the flexible portion 71 of the pilot diaphragm assembly is subject to possible rupture. Without the flange 82 should this rupture be of sufficient size, the pilot valve mechanism would fail to function properly. With the flange 82, a rupture in the flexible diaphragm portion 71, is accompanied by flow of gas through the rupture from the chamber 76, through the restricted annular orifice 84. The pressure above the flange 82 is therefore immediately lowered relative to the pressure below the same, and the differential pressure causes a resulting force of substantial magnitude which urges the diaphragm assembly upwardly. To describe this in a different way, the flow restricting annular orifice 84 causes flange 82 to form a supplemental fluid pressure area which is effective in the event of a rupture in the diaphragm portion 71, accompanied by venting of gas through the rupture. The larger the rupture and the greater the venting of gas through the rupture, the more effective is the supplemental area. The effect just described is ample to create forces acting upwardly upon the diaphragm assembly, after a rupture has occurred, to insure proper opening of the pilot valve 37 to operate the main valve mechanism. With a substantially complete rupture of the flexible portion 71 of the diaphragm, the area of the resulting opening through the diaphragm will be many times greater than the area of orifice 84, and the pressure required for operation of the pilot valve will be comparable to the operating pressure with the diaphragm intact. This is because the effective pressure area provided by skirt 82 and the plate 64 for a complete rupture is not considerably less than the effective area of the diaphragm with portion 71 intact, which latter area is approximately the area of a circle corresponding to the mean diameter of portion 71. Therefore, with the proportions illustrated and referred to above, if the diaphragm is operated to open the pilot valve at a pressure of about 2.5 pounds per square inch in the tank to which the apparatus is connected, the diaphragm will operate at a pressure of about 2.3 pounds with a complete rupture, and at pressures somewhere between 2.3 and 2.5 pounds per square inch for varying degrees of rupture.

It will be apparent that the feature described above is of importance in many instances, particularly in connection with large storage tanks containing volatile liquids. In such instances it is essential to insure proper venting of gas from the tank when the pressure attains a predetermined value, in order to avoid possible bursting of the tank.

In addition to the feature described above, the complete apparatus possesses certain additional features which contribute to its commercial success. Reference has been made to the fact that the main valve mechanism 10 will function irrespective of ice formation upon the seating surfaces. This is likewise true of the pilot valve mechanism 11, because of the relatively large effective area afforded by the pilot diaphragm, and because of the material utilized for the pilot valve seating surfaces. Also the pilot diaphragm affords adequate pressure area to avoid inoperativeness due to accumulation of ice upon the guide bushing 61. Should there be a rupture of the diaphragm 24 for the main valve mechanism, such rupture would result in a sudden lowering of pressure in chamber 27, and therefore the tank would be automatically vented by opening of pallet 13.

It has been pointed out that the pilot valve mechanism is loaded by means of a compression spring 54. Should this compression spring weaken or fail, the only effect will be a lowering of the pressure at which the apparatus will function, or opening of the closure 13 in the event of total failure of the compression spring.

With respect to the inter-connecting tube 29, a possible failure of this tube likewise causes a venting and lowering of pressure in chamber 27, to open the pallet 13. The pallet 13 will also automatically open in the event a condition of extreme vacuum exists in the tank, because the difference between the area presented to the vacuum by the lower side of the pallet, and the larger area presented to the same vacuum by the upper side of the pallet and diaphragm 24, causes an upward opening force on the diaphragm 24.

All of the above features serve to fully guarantee the safety of a storage tank with which the apparatus is employed. In other words the tank is properly protected with respect to excessive pressure conditions, the usual climatic conditions causing ice formation, or failure of any of the vital working parts of the regulator. In addition the apparatus will operate within a relatively narrow range of pressure variations, thus securing maximum economy when utilized in conjunction with storage tanks containing volatile liquids.

My invention is capable of incorporation in various embodiments, in addition to the particular embodiment described above. For example the diaphragm for operating the pilot valve, and the means forming a supplemental pressure area for the same, may be formed as illustrated in Figs. 5 to 7 inclusive. Thus referring to Fig. 5, the flexible diaphragm element 66 is shown engaged by the upper and lower diaphragm plates 91 and 92. The upper diaphragm plate or ring 91 is shown provided with a skirt 93, corresponding to the skirt 82 of Fig. 2. The outer periphery of this skirt extends into relatively close proximity with the adjacent cylindrical shaped surface of the body, thereby forming the restricted annular orifice 94, corresponding to the orifice 84 of Fig. 2. The operation of this arrangement is substantially the same as Fig. 2, in that when the flexible diaphragm element 66 is ruptured, and a flow of gas or fluid occurs through orifice 94, skirt 93 forms in effect a supplemental pressure area, capable of operating the pilot valve.

Fig. 6 illustrates an arrangement in which a separate disc or like element, forms a supplemental pressure area. In this case the flexible element 66 is engaged by the upper and lower diaphragm plates 98 and 92, and disposed on one side of this assembly, there is a flat disc 101. This disc can be operatively connected in any suitable manner to the diaphragm assembly, as for example to the operating rod 42. The outer periphery of disc 101 is in close proximity with the adjacent cylindrical walls of the body, thus affording the restricted annular orifice 103.

The arrangement of Fig. 7 is similar to Fig. 6, except that the disc for forming a supplemental pressure area, is not directly attached to the diaphragm assembly. Thus the disc 104 corresponding to the disc 101 of Fig. 6, is shown secured to the guide rod 106, which in turn is loosely retained by the guide 107. The diaphragm assembly can be formed somewhat as illustrated in Fig. 6, as for example by the flexible element 66 engaged by the upper and lower diaphragm plates 102 and 92. Disc 104 has its outer periphery in close proximity with the adjacent walls of the body, to form the annular restricted orifice of the body, to form the annular restricted orifice 108. Normally disc 104 would remain in a lowered position, out of engagement with the diaphragm assembly. However, in the event the flexible portion 71 of the diaphragm assembly is ruptured and a substantial flow of fluid occurs through the rupture, the restriction to flow through the annular orifice 108 causes the fluid pressure to force disc 104 upwardly against the lower side of the diaphragm assembly, thus forming a supplemental fluid pressure area for operation of the pilot valve.

It should be understood that the pilot mechanism 11 need not be mounted separate from the main valve mechanism, but may for example be mounted directly upon the cover 26, provided passage 77 is properly connected to the storage tank.

I claim:

1. In fluid flow control apparatus, a valve movable between open and closed positions, fluid pressure operating means including a flexible diaphragm portion subject to rupture, said means being capable of operating the valve either before or after rupture of said flexible diaphragm portion, and a hollow body serving to enclose said fluid pressure operated means and sealed with respect to the periphery of said flexible diaphragm portion, said body affording a closed chamber on one side of said fluid pressure operated means and an inlet communicating with said chamber for connection with a source of fluid under pressure, the space on the opposite side of said means being freely vented, said fluid pressure operated means comprising a diaphragm assembly including said flexible diaphragm portion and providing an effective fluid pressure area for normal operation of the valve, and supplemental means associated with the diaphragm assembly and forming a fluid pressure area for operation of the valve in the event of rupture of the flexible diaphragm portion, said area being at least as large as the effective fluid pressure area of said diaphragm assembly for normal operation of the valve, said supplemental means affording an orifice through which fluid is vented from said chamber as the fluid flows through a diaphragm rupture, said orifice being relatively small compared to the area of the flexible diaphragm portion and the cross sectional area of said inlet being relatively large compared to said orifice.

2. In fluid flow control apparatus, a valve movable between open and closed position, fluid pressure operating means including a flexible annular diaphragm portion, said means serving to operate the valve either before or after rupture of said flexible diaphragm portion, and a hollow body serving to enclose said means and sealed with respect to the periphery of the flexible diaphragm portion, said body affording a closed chamber on one side of the fluid pressure operating means, the body providing an inlet opening to said chamber for connection with a source of fluid under pressure, the space on the other side of the fluid pressure operating means being freely vented, said fluid pressure operating means comprising a diaphragm assembly including said flexible diaphragm portion and providing an effective fluid pressure area for normal operation of the valve, and supplemental means associated with the diaphragm assembly and forming a fluid pressure area for operation of the valve in the event of rupture of the flexible diaphragm portion, said area being larger than the effective fluid pressure area of said diaphragm assembly for normal operation of the valve, said supplemental means also affording an orifice through which fluid is vented from said chamber as fluid flows through a diaphragm rupture, the orifice being relatively small compared to the area of the flexible diaphragm portion, said inlet having a cross sectional area relatively large compared to the area of the orifice.

3. In fluid flow control apparatus, a valve movable between open and closed positions, fluid pressure operating means including an annular flexible diaphragm portion, said means serving to operate the valve either before or after the rupture of said flexible diaphragm portion, and a hollow body serving to enclose said means and sealed with respect to the periphery of the flexible diaphragm portion, said body affording a closed chamber on one side of said fluid pressure operating means, the body providing an inlet opening to said chamber for connection with a source of fluid under pressure, the space on the other side of said fluid pressure operating means being freely vented, said means comprising a diaphragm assembly including said flexible diaphragm portion and providing an effective fluid pressure area for normal operation of the valve, and a rigid supplemental member associated with the diaphragm assembly and forming a fluid pressure area for operation of the valve in the event of rupture of the flexible diaphragm portion, said area being at least as large as the effective fluid pressure area of the diaphragm assembly for normal operation of the valve, said supplemental member having its periphery spaced from physical contact with the inner side walls of said body to provide an annular orifice through which fluid is vented from said chamber as fluid flows through a diaphragm rupture, the orifice being relatively small compared to the area of the flexible diaphragm portion and the cross sectional area of the inlet being relatively large compared to the cross sectional area of said orifice.

4. In fluid flow control apparatus, a valve movable between open and closed positions, fluid pressure operating means including an annular flexible diaphragm portion, said means serving to operate the valve either before or after the rupture of said flexible diaphragm portion, and a hollow body serving to enclose said means and sealed with respect to the periphery of the flexible diaphragm portion, said body affording a closed chamber on one side of said fluid pressure operating means, the body providing an inlet opening to said chamber for connection with a source of fluid under pressure, the space on the other side of said fluid pressure operating means being freely vented, said means comprising a diaphragm assembly including said flexible diaphragm portion and providing an effective fluid pressure area for normal operation of the valve, and a rigid supplemental member associated with the diaphragm assembly and forming a fluid pressure area for operation of the valve in the event of rupture of the flexible diaphragm portion, said area being at least as large as the effective fluid pressure area of the diaphragm assembly for normal operation of the valve, said supplemental member being spaced from direct physical contact with the flexible diaphragm portion and having its periphery spaced from physical contact with the inner side walls of said body to provide an annular orifice through which fluid is vented from said chamber as fluid flows through a diaphragm rupture, the orifice being relatively small compared to the area of the flexible diaphragm portion and the cross sectional area of the inlet being relatively large compared to the cross sectional area of said orifice.

5. In fluid flow control apparatus, a valve movable between open and closed positions, fluid pressure operating means including an annular flexible diaphragm portion, said means serving to operate the valve either before or after the rupture of said flexible diaphragm portion, and a hollow body serving to enclose said means and sealed with respect to the periphery of the flexible diaphragm portion, said body affording a closed chamber on one side of said fluid pressure operating means, the body providing an inlet opening to said chamber for connection with a source of fluid under pressure, the space on the other side of said fluid pressure operating means being freely vented, said means comprising a diaphragm assembly including said flexible diaphragm portion and providing an effective fluid pressure area for normal operation of the valve, and a rigid supplemental member associated with the diaphragm assembly and forming a fluid pressure area for operation of the valve in the event of rupture of the flexible diaphragm portion, said area being at least as large as the effective fluid pressure area of the diaphragm assembly for normal operation of the valve, said supplemental member having a diameter greater than the diameter of the main effective area of the diaphragm assembly, and having its periphery spaced from physical contact with the inner side walls of said body to provide an annular orifice through which fluid is vented from said chamber as fluid flows through a diaphragm rupture, the orifice being relatively small compared to the area of the flexible diaphragm portion and the cross sectional area of the inlet being relatively large compared to the cross sectional area of said orifice.

6. In fluid flow control apparatus, a valve movable between open and closed positions, fluid pressure operating means including an annular flexible diaphragm portion, said means serving to operate the valve either before or after the rupture of said flexible diaphragm portion, and a hollow body serving to enclose said means and sealed with respect to the periphery of the flexible diaphragm portion, said body affording a closed chamber on one side of said fluid pressure operating means, the body providing an inlet opening to said chamber for connection with a source of fluid under pressure, the space on the other side of said fluid pressure operating means being freely vented, said means comprising a diaphragm assembly including said flexible diaphragm portion and providing an effective fluid pressure area for normal operation of the valve, and a rigid supplemental member associated with the diaphragm assembly and forming a fluid pressure area for operation of the valve in the event of rupture of the flexible diaphragm portion, said area being at least as large as the effective fluid pressure area of the diaphragm assembly for normal operation of the valve, said supplemental member being mounted upon the diaphragm assembly, and being in the form of a skirt which is spaced from the flexible part of the diaphragm assembly and has an outer diameter which is greater than the diameter of the main effective area of the diaphragm assembly, and said supplemental member having its periphery spaced from physical contact with the inner side walls of said body to provide an annular orifice through which fluid is vented from said chamber as fluid flows through a diaphragm rupture, the orifice being relatively small compared to the area of the flexible diaphragm portion and the cross sectional area of the inlet being relatively large compared to the cross sectional area of said orifice.

7. In fluid flow control apparatus, a valve movable between open and closed positions, fluid pressure operating means including an annular flexible diaphragm portion, said means serving to operate the valve either before or after the rupture of said flexible diaphragm portion, and a hollow body serving to enclose said means and sealed with respect to the periphery of the flexible diaphragm portion, said body affording a closed chamber on one side of said fluid pressure operating means, the body providing an inlet opening to said chamber for connection with a source of fluid under pressure, the space on the other side of said fluid pressure operating means being freely vented, said means comprising a diaphragm assembly including said flexible diaphragm portion and providing an effective fluid pressure area for normal operation of the valve, and a rigid supplemental member associated with the diaphragm assembly and forming a fluid pressure area for operation of the valve in the event of rupture of the flexible diaphragm portion, said area being at least as large as the effective fluid pressure area of the diaphragm assembly for normal operation of the valve, said supplemental member being mounted within the hollow body independent of the diaphragm assembly, and being moved by fluid pressure to operate the valve only in the event of rupture of the flexible diaphragm portion, and said supplemental member having its periphery spaced from physical contact with the inner side walls of said body to provide an annular orifice through which fluid is vented from said chamber as fluid flows through a diaphragm rupture, the orifice being relatively small compared to the area of the flexible diaphragm portion and the cross sectional area of the inlet being relatively large compared to the cross sectional area of said orifice.

ALBERT E. JURS.